United States Patent
Zhao et al.

(10) Patent No.: US 11,290,646 B2
(45) Date of Patent: Mar. 29, 2022

(54) IMAGE CAPTURING

(71) Applicant: HANGZHOU HIKVISION DIGITAL TECHNOLOGY CO., LTD., Hangzhou (CN)

(72) Inventors: Guohui Zhao, Hangzhou (CN); Zhuanqiang Li, Hangzhou (CN)

(73) Assignee: HANGZHOU HIKVISION DIGITAL TECHNOLOGY CO., LTD.

( * ) Notice: Subject to any disclaimer, the term of this patent is extended or adjusted under 35 U.S.C. 154(b) by 0 days.

(21) Appl. No.: 17/112,683

(22) Filed: Dec. 4, 2020

(65) Prior Publication Data

US 2021/0092295 A1 Mar. 25, 2021

Related U.S. Application Data

(63) Continuation of application No. PCT/CN2019/076168, filed on Feb. 26, 2019.

(30) Foreign Application Priority Data

Jun. 4, 2018 (CN) .......................... 201810563129.1

(51) Int. Cl.
*H04N 5/232* (2006.01)
*G06T 5/50* (2006.01)
(Continued)

(52) U.S. Cl.
CPC ........... *H04N 5/23245* (2013.01); *G06T 5/50* (2013.01); *H04N 5/2256* (2013.01);
(Continued)

(58) Field of Classification Search
None
See application file for complete search history.

(56) References Cited

U.S. PATENT DOCUMENTS 4,731,854 A * 3/1988 Gonzalez ........... G06K 7/10851
  348/148
6,650,765 B1 * 11/2003 Alves ................... G08G 1/0175
  340/933

(Continued)

FOREIGN PATENT DOCUMENTS

CN 202887451 4/2013
CN 105407611 3/2016
(Continued)

OTHER PUBLICATIONS

Chinese Office Action issued in Chinese Application No. 201810563129.1 dated Apr. 13, 2020, 23 pages (With English Translation).

(Continued)

*Primary Examiner* — James M Hannett
(74) *Attorney, Agent, or Firm* — Fish & Richardson P.C.

(57) ABSTRACT

The present disclosure provides an image capturing method and system. The image capturing method provided by the present disclosure includes: controlling the camera to switch between a first working mode and a second working mode according to an event detection result; in the first working mode, receiving visible light flashing supplementary lighting, and controlling the first image sensor to perform visible light image capturing; in the second working mode, receiving visible light non-flashing supplementary lighting and infrared supplementary lighting, controlling the first image sensor to perform visible light image capturing, and controlling the second image sensor to perform infrared image capturing, and performing fusion processing on the visible light image and the infrared image captured in the second working mode.

16 Claims, 6 Drawing Sheets

(51) Int. Cl.
*H04N 5/225* (2006.01)
*H04N 5/235* (2006.01)
*H04N 5/33* (2006.01)
*H04N 7/18* (2006.01)

(52) U.S. Cl.
CPC ......... *H04N 5/2258* (2013.01); *H04N 5/2351* (2013.01); *H04N 5/2354* (2013.01); *H04N 5/33* (2013.01); *H04N 7/185* (2013.01); *H04N 7/188* (2013.01); *G06T 2207/10024* (2013.01); *G06T 2207/10048* (2013.01); *G06T 2207/20221* (2013.01)

(56) References Cited

U.S. PATENT DOCUMENTS

| | | | |
|---|---|---|---|
| 8,704,889 B2* | 4/2014 | Hofman | G06K 9/209 348/143 |
| 9,172,913 B1 | 10/2015 | Johnston et al. | |
| 10,867,193 B1* | 12/2020 | Hansen | G06K 9/3258 |
| 2006/0269105 A1* | 11/2006 | Langlinais | G06K 9/20 382/105 |
| 2009/0079825 A1 | 3/2009 | Calnegru | |
| 2010/0309315 A1* | 12/2010 | Hogasten | H04N 5/332 348/164 |
| 2011/0043381 A1* | 2/2011 | Sirota | G08G 1/0175 340/937 |
| 2011/0200319 A1* | 8/2011 | Kravitz | H04N 5/232 396/333 |
| 2013/0342703 A1 | 12/2013 | Lin | |
| 2017/0111562 A1 | 4/2017 | Nakamura | |
| 2017/0132482 A1* | 5/2017 | Kim | B60K 35/00 |
| 2017/0352139 A1* | 12/2017 | Mrdjen | G02B 23/04 |

FOREIGN PATENT DOCUMENTS

| | | |
|---|---|---|
| CN | 106060364 | 10/2016 |
| CN | 106973241 | 7/2017 |
| CN | 107370955 | 11/2017 |
| CN | 107580163 | 1/2018 |
| CN | 206865574 | 1/2018 |
| CN | 107845083 | 3/2018 |
| CN | 108111731 | 6/2018 |
| KR | 20150011098 | 1/2015 |
| WO | WO2013183330 | 12/2013 |

OTHER PUBLICATIONS

Chinese Office Action issued in Chinese issued in Application No. 201810563129.1 dated Sep. 15, 2020, 20 pages (With English Translation).

PCT International Search Report in International Application No. PCT/CN2019/076,168, dated May 17, 2019, 4 pages (With English Translation).

Extended European Search Report issued in European Application No. 19815122.7, dated Jun. 10, 2021, 8 pages.

PCT Written Opinion in International Application No. PCT/CN2019/076168, dated May 17, 2019, 9 pages (With English Translation).

* cited by examiner

IMAGE CAPTURING

CROSS REFERENCE TO RELATED APPLICATIONS

The present application is a continuation of International Patent Application Serial No. PCT/CN2019/076168 filed on Feb. 26, 2019. International Patent Application Serial No. PCT/CN2019/076168 claims priority to Chinese Patent Application No. 201810563129.1 filed on Jun. 4, 2018. The entire contents of each of the referenced applications are incorporated herein by reference for all purposes.

TECHNICAL FIELD

The present disclosure relates to the field of image capturing technology.

BACKGROUND

Video images and snapshots of vehicles passing a traffic intersection are captured by utilizing a camera. When taking a snapshot, it is generally required to obtain information such as license plate color, license plate number, vehicle body color, and face information of the driver in the vehicle. The snapshot can be completed by utilizing a camera in assistance with visible light flashing equipment which is mainly used for supplementary lighting.

Since the supplementary lighting with the visible light flashing equipment has light pollution at night, and will affect the driver and cause hidden dangers to driving safety, in order to avoid the problem, infrared light flashing equipment have been used for the supplementary lighting recently.

However, when infrared light flashing equipment is used for supplementary lighting, the image captured by the camera will have color deviation or even be in black and white, which is not desirable to analyze driver behavior and vehicle structured information (vehicle structured information can include vehicle body color, license plate information, and so on), and cannot meet current requirements on traffic checkpoint cameras.

SUMMARY

In view of this, the present disclosure provides an image capturing method and system. Snapshots obtained according to the method can meet the requirements and no light pollution occurs.

In a first aspect of the present disclosure, an image capturing method is provided, including: controlling a camera to switch between a first working mode and a second working mode according to an event detection result; in the first working mode, receiving visible light flashing supplementary lighting, and controlling a first image sensor to perform visible light image capturing, to obtain a visible light image in the first working mode; in the second working mode, receiving visible light non-flashing supplementary lighting and infrared supplementary lighting, controlling the first image sensor to perform visible light image capturing, to obtain a visible light image in the second working mode, controlling a second image sensor to perform infrared image capturing, to obtain an infrared image, and performing fusion processing on the visible light image and the infrared image in the second working mode.

In a second aspect of the present disclosure, an image capturing system is provided, including: a camera configured to include a first image sensor and a second image sensor; wherein the camera is configured to: in a first working mode, control the first image sensor to perform visible light image capturing; and in a second working mode, control the first image sensor to perform visible light image capturing, control the second image sensor to perform infrared image capturing, and perform fusion processing on a visible light image and an infrared image captured in the second working mode; visible light flashing supplementary lighting equipment, wherein the visible light flashing equipment is turned on in the first working mode, and turned off in the second working mode; infrared supplementary lighting equipment, wherein the infrared supplementary lighting equipment is turned off in the first working mode, and turned on in the second working mode; and visible light non-flashing supplementary lighting equipment, wherein the visible light non-flashing supplementary lighting equipment is turned off in the first working mode, and turned on in the second working mode.

In the method and system provided by the present disclosure, by setting the first working mode and the second working mode on the camera, the camera is controlled to switch between the first working mode and the second working mode according to the event detection result. The camera, in the first working mode, receives visible light flashing supplementary lighting, and controls the first image sensor to capture a visible light image; in the second working mode, receives visible light flashing supplementary lighting and infrared supplementary lighting, controls the first image sensor to capture a visible light image, controls the second image sensor to capture an infrared image, and performs fusion processing on the visible light image and the infrared image captured in the second working mode. In this way, an image capturing method suitable for both night and daytime can be provided to avoid the problem of light pollution or the captured image obtained not meeting the requirements.

DETAILED DESCRIPTION OF THE EMBODIMENTS

Figure 1:
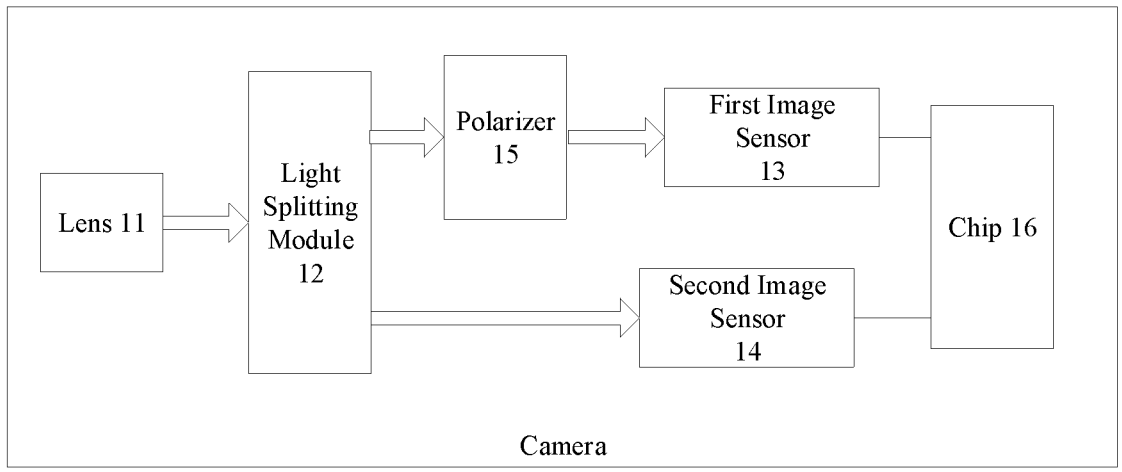
FIG. 1 is a schematic structural diagram of a camera shown in an example of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish different information of one category. For example, without departing from the scope of the present disclosure, first information may be referred as second information; and similarly, second information may also be referred as first information. Depending on the context, the word "if" as used herein may be interpreted as "when" or "upon" or "in response to determining".

The present disclosure provides a method for capturing images that meets the requirements without light pollution.

Several specific examples are given below to introduce the technical solutions of the present disclosure in detail. The following specific examples can be combined with each other, and the same or similar concepts or processes may not be repeated in some examples.

The camera of the present disclosure will be briefly introduced below. Specifically, FIG. 1 is a schematic structural diagram of a camera shown in an example of the present disclosure. Referring to FIG. 1, the camera provided in this example includes a lens 11, a light splitting module 12 arranged on a light exiting path of the lens 11, a first image sensor 13 and a second image sensor 14 respectively arranged on different light exiting light paths of the light splitting module 12, a polarizer 15 arranged between the light splitting module 12 and the first image sensor 13, and a chip 16 connected to the first image sensor 13 and the second image sensor 14 respectively. The light splitting module 12 is configured to divide the light from the lens 11 into a visible light and an infrared light. The visible light output from the light splitting module 12 is polarized by the polarizer 15 and then passed to the first image sensor 13; the infrared light output from the light splitting module 12 is passed to the second image sensor 14. The first image sensor 13 is configured to capture a visible light image based on the received visible light; the second image sensor 14 is configured to capture an infrared image based on the received infrared light.

Still referring to FIG. 1, the camera provided in this example has a first working mode and a second working mode. In the first working mode, the second image sensor 14 is in a non-working state, and at this time, the camera receives visible light flashing supplementary lighting, and controls the first image sensor 13 to capture a visible light image. In the second working mode, the first image sensor 13 and the second image sensor 14 are both in the working state, and at this time, the camera receives visible light flashing supplementary lighting and infrared supplementary lighting, controls the first image sensor 13 to capture a visible light image, controls the second image sensor 14 to capture an infrared image, and perform fusion processing on the visible light image and the infrared image captured in the second working mode.

The following describes in detail the image capturing method provided by the present disclosure.

Figure 2:
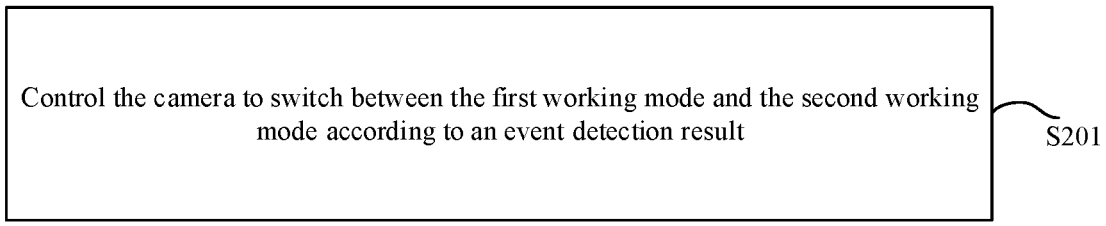
FIG. 2 is a flowchart of an image capturing method provided by an example of the present disclosure.

FIG. 2 is a flowchart of the image capturing method provided by an example of the present disclosure. The image capturing method can be applied to a camera or other control equipment such as a computer. Take a camera as an example for description, and referring to FIG. 2, the method provided in this example may include the following steps.

At S201, the camera is controlled to switch between a first working mode and a second working mode according to an event detection result;

in the first working mode, the camera receives visible light flashing supplementary lighting, and controls the first image sensor to perform visible light image capturing to obtain a visible light image in the first working mode;

in the above second working mode, the camera receives visible light non-flashing supplementary lighting and infrared supplementary lighting, controls the first image sensor to perform visible light image capturing to obtain a visible light image in the second working mode, controls the second image sensor to perform infrared image capturing to obtain an infrared image, and performs fusion processing on the visible light image and the infrared image in the second working mode.

In an example, the event detection result may include a time point detection result or/and an ambient brightness detection result.

In an example, the event detection result includes a time point detection result. In this step, when a first time point is detected, the camera is controlled to switch from the second working mode to the first working mode, and when a second time point is detected, the camera is controlled to switch from the first working mode to the second working mode.

It should be noted that the first time point and the second time point are set according to actual needs, and in this example, the set values are not limited. The solution will be illustrated below with the first time point being 6:00 every day and the second time point being 18:00 every day as an example. In this example, when it is detected that the current time is 6:00, the camera is controlled to switch from the second working mode to the first working mode. When it is detected that the current time is 18:00, the camera is controlled to switch from the first working mode to the second working mode. In this way, during the day, the camera works in the first working mode, and at night, the camera works in the second working mode.

In another example, the event detection result includes an ambient brightness detection result. In this step, when it is detected that the ambient brightness has risen to be higher than or equal to a preset threshold, the camera is controlled to switch from the second working mode to the first working mode. When it is detected that the ambient brightness is lower than the preset threshold, the camera is controlled to switch from the first working mode to the second working mode.

Specifically, the preset threshold is set according to actual needs. In this example, the specific value of the preset threshold is not limited. It should be noted that when it is detected that the ambient brightness has risen to be higher than or equal to the preset threshold, it means that the current environment has changed from night to day, and the camera is controlled to switch to the first working mode; further, when it is detected that the ambient brightness is lower than the preset threshold, it means that the current environment changes from day to night, and the camera is controlled to switch to the second working mode. In this way, during the day, the camera works in the first working mode, and at night, the camera works in the second working mode.

In still another example, the event detection result includes the time point detection result and the ambient brightness detection result. For example, in this step, when it is detected that the current time is later than the first time point, and the current ambient brightness is higher than or equal to the preset threshold, the camera is controlled to switch from the second working mode to the first working mode; when it is detected that the current time is later than the second time point, and the current ambient brightness is lower than the preset threshold, the camera is controlled to switch from the first working mode to the second working mode.

Based on the previous description, during the day, the camera works in the first working mode. At this time, the camera receives visible light flashing supplementary lighting and controls the first image sensor to capture a visible light image. At night, the camera works in the second working mode. At this time, the camera receives visible light non-flashing supplementary lighting and infrared supplementary lighting, controls the first image sensor to capture a visible light image, controls the second image sensor to capture an infrared image, and perform fusion processing on the visible light image and the infrared image captured in the second working mode. In this way, at night, since no visible light flashing supplementary lighting is used, there will be no light pollution problem. In addition, the fused image obtained from fusing the visible light image and infrared image is a color image, which can solve the problem that infrared image obtained when using infrared supplementary lighting does not meet the requirements.

In an example, the infrared supplementary lighting includes infrared flashing supplementary lighting or infrared constant (or constant-on, which indicates maintaining an ON state) supplementary lighting. The visible light non-flashing supplementary lighting includes visible light strobe (i.e., flashing frequently) supplementary lighting or visible light constant supplementary lighting.

In the method provided by this example, by setting the first working mode and the second working mode on the camera, the camera is controlled to switch between the first working mode and the second working mode according to the event detection result. The camera, in the first working mode, receives visible light flashing supplementary lighting, and controls the first image sensor to capture a visible light image; in the second working mode, receives visible light non-flashing supplementary lighting and infrared supplementary light, controls the first image sensor to capture a visible light image, controls the second image sensor to capture an infrared image, and performs fusion processing on the visible light image and the infrared image captured in the second working mode. In this way, an image capturing method suitable for both night and daytime can be provided to avoid the problem of light pollution or the obtained snapshot not meeting the requirements.

In an example, in the first working mode, the camera further controls the light through the lens to be split and polarized before entering the first image sensor.

In the second working mode, the camera also controls the light through the lens to be split before entering the first image sensor and the second image sensor.

Specifically, still referring to FIG. 1, in the first working mode, the camera controls the light through the lens to be split by the light splitting module, and the visible light obtained from the splitting is polarized by the polarizer and enters the first image sensor, to control the first image sensor to capture a visible light image. In the second working mode, the camera controls the light through the lens to be split by the light splitting module; the visible light obtained from the splitting enters the first image sensor, and the infrared light obtained from the splitting enters the second image sensor; and the first image sensor is controlled to capture a visible light image, and the second image sensor is controlled to capture an infrared image.

Further, in a possible implementation of the present disclosure, the camera, in the first working mode, performs image signal processing ISP and encoding processing on the captured visible light image.

In the second working mode, the camera performs ISP processing and encoding processing on the fused image resulted from fusion processing on the visible light image and the infrared image.

Specifically, in the first working mode, after the camera captures the visible light image through the first image sensor, the camera can further perform Image Signal Processing (ISP) and encoding processing on the visible light image signal to satisfy actual demand. In the second working mode, the camera captures a visible light image through the first image sensor, captures an infrared image through the second image sensor, and performs fusion processing on the visible light image and infrared image captured in the second working mode, and may further perform ISP processing and encoding processing on the fused image resulted from the fusion processing. The specific implementation process and implementation principle of ISP processing and encoding processing will not be repeated here.

Figure 3:
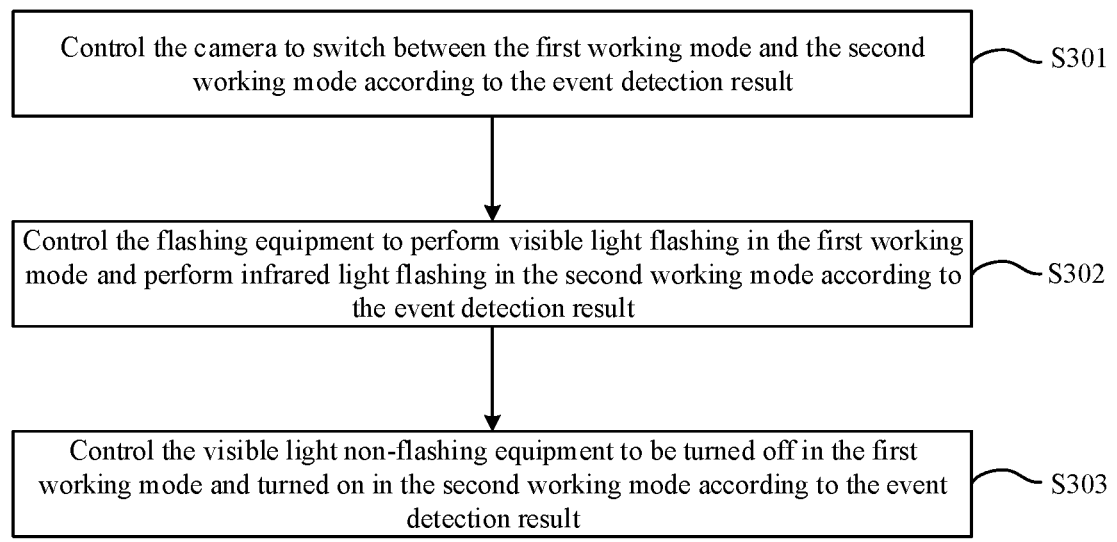
FIG. 3 is a flowchart of the image capturing method provided by another example of the present disclosure.

FIG. 3 is a flowchart of an image capturing method provided by an example of the present disclosure. Referring to FIG. 3, the method provided in this example may include the following steps.

At S301, a camera is controlled to switch between a first working mode and a second working mode according to an event detection result.

For the specific implementation process and implementation principle of this step, reference can be made to the description in the previous example, which will not be repeated here.

At S302, flashing equipment is controlled to perform visible light flashing in the first working mode and perform infrared light flashing in the second working mode according to the event detection result.

Specifically, in this example, the flashing equipment has a visible light flashing mode and an infrared light flashing mode, and the flashing equipment can switch between the two flashing modes.

Based on the above examples, in case that the event detection result includes the time point detection result, when the first time point is detected, the flashing equipment can be controlled to perform visible light flashing, so that the flashing equipment can perform visible light flashing in the first working mode; when the second time point is detected, the flashing equipment can be controlled to perform infrared light flashing, so that the flashing equipment performs infrared light flashing in the second working mode.

Further, in case that the event detection result includes the ambient brightness detection result, when it is detected that the ambient brightness has risen to be higher than or equal to the preset threshold, the flashing equipment can be controlled to perform visible light flashing, so that the flashing equipment can perform visible light flashing in the first working mode; when it is detected that the ambient brightness is reduced to be lower than the preset threshold, the flashing equipment is controlled to perform infrared light flashing, so that the flashing equipment performs infrared light flashing in the second working mode.

In addition, in case that the event detection result includes the time point detection result and the ambient brightness detection result, when it is detected that the current time is later than the first time point, and the current ambient brightness is higher than or equal to the preset threshold, the flashing equipment can be controlled to perform visible light flashing, so that the flashing equipment can perform visible light flashing in the first working mode; when it is detected that the current time is later than the first time point and the current ambient brightness is lower than the preset threshold, the flashing equipment is controlled to perform infrared light flashing, so that the flashing equipment performs infrared light flashing in the second working mode.

In the method provided in this example, the camera is controlled to switch between the first working mode and the second working mode according to the event detection result, and at the same time the flashing equipment is controlled to perform visible light flashing in the first working mode, and perform infrared light flashing in the second working mode according to the event detection result. In this way, not only can the automatic control of the flashing equipment be realized, but also the flashing equipment can be controlled to work according to the current working mode of the camera.

At S303, visible light non-flashing equipment is controlled to be turned off in the first working mode and turned on in the second working mode according to the event detection result.

Based on the foregoing description, in one example, in case that the event detection result includes the time point detection result, when the first time point is detected, the visible light non-flashing equipment can be controlled to be turned off, so that the visible light non-flashing equipment is turned off in the first working mode; when the second time point is detected, the visible light non-flashing equipment can be controlled to be turned on, so that the visible light non-flashing equipment is turned on in the second working mode.

In the method provided in this example, the camera is controlled to switch between the first working mode and the second working mode according to the event detection result, and at the same time, the visible light non-flashing equipment is controlled to be turned off in the first working mode and turned on in the second working mode according to the event detection result. In this way, not only can the automatic control of the visible light non-flashing equipment be realized, but also the visible light non-flashing equipment can be controlled to work according to the current working mode of the camera.

The image capturing method provided by the present disclosure has been introduced above, and the image capturing system provided by the present disclosure will be described below.

Figure 4:
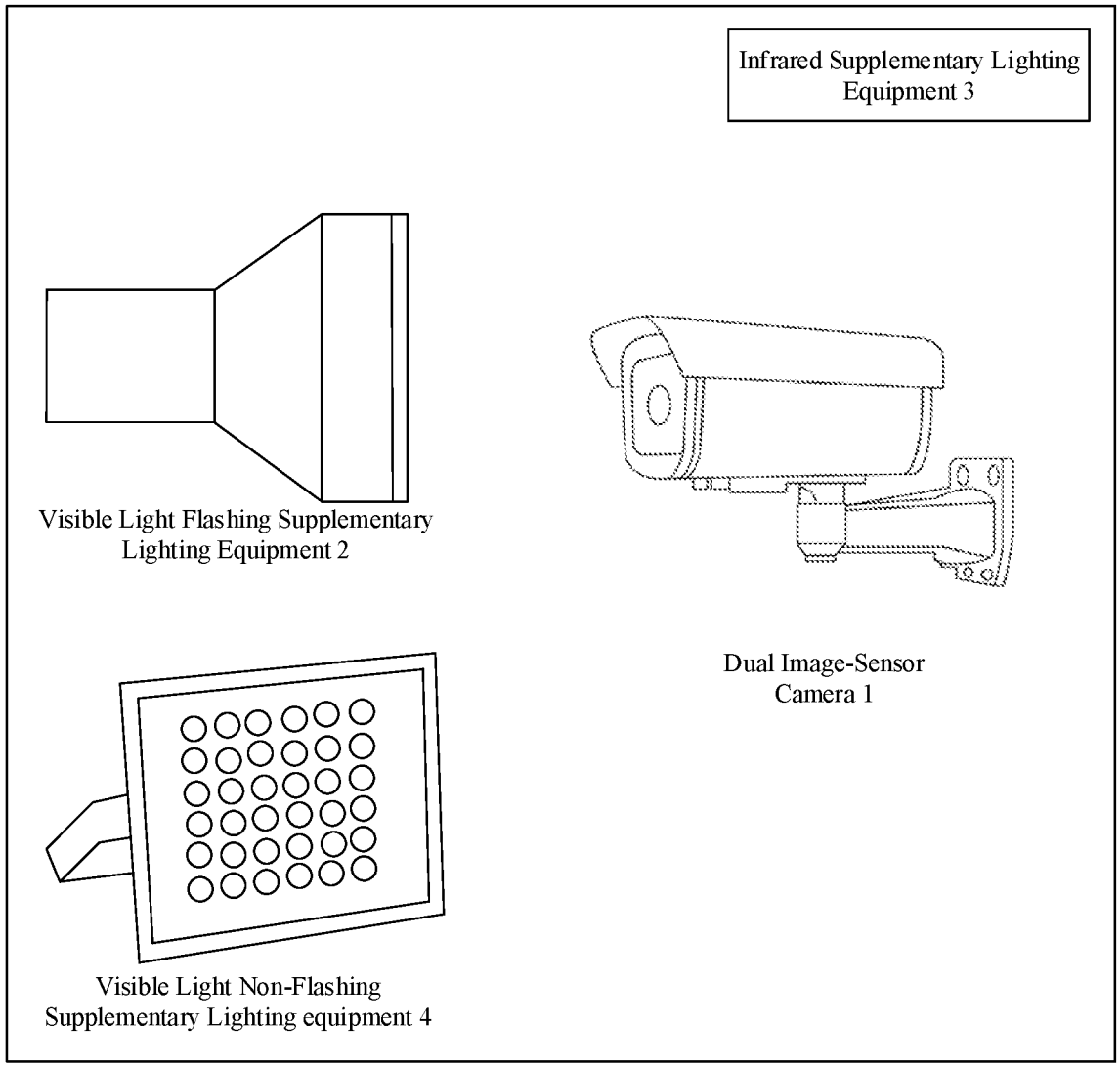
FIG. 4 is a schematic diagram of an image capturing system provided by an example of the present disclosure.

FIG. 4 is a schematic diagram of the image capturing system provided by an example of the present disclosure. Referring to FIG. 4, the system provided in this example may include:

a camera 1, including a first image sensor and a second image sensor, where the camera, in a first working mode, controls the first image sensor to capture a visible light image, and in a second working mode, controls the first image sensor to capture a visible light image and controls the second image sensor to capture an infrared image, and perform fusion processing on the visible light image and the infrared image captured in the second working mode;

visible light flashing supplementary lighting equipment 2, where the visible light flashing supplementary lighting equipment is turned on in the first working mode, and turned off in the second working mode;

infrared supplementary lighting equipment 3, where the infrared supplementary lighting equipment is turned off in the first working mode, and turned on in the second working mode;

visible light non-flashing supplementary lighting equipment 4, where the visible light non-flashing supplementary lighting equipment is turned off in the first working mode, and turned on in the second working mode.

Specifically, the working principle of the camera can be referred to the description in the previous example, which will not be repeated here.

In an example, the infrared supplementary lighting equipment 3 may be infrared flashing supplementary lighting equipment or infrared constant supplementary lighting equipment. In addition, the visible light non-flashing supplementary lighting equipment 4 may be visible light strobe-strobe equipment or visible light constant equipment.

Further, in an example, the visible light flashing supplementary lighting equipment 2 and the infrared supplementary lighting equipment 3 are integrated, for example, in a flashing light, and the flashing light performs visible light flashing supplementary lighting in the first working mode, and performs infrared flashing supplementary lighting in the second working mode.

The system provided by this example can enable the visible light flashing supplementary lighting equipment to be turned on when the camera is set in the first working mode in the daytime, so that the camera captures an image in corporation with the visible light flashing supplementary lighting equipment. Furthermore, the system can enable the infrared supplementary lighting equipment and the visible light non-flashing supplementary lighting equipment to be turned on when the camera is set in the second working mode at night. At this time, the camera captures an image in corporation with the infrared supplementary lighting equipment and the visible light non-flashing supplementary lighting equipment. In this way, light pollution can be avoided, and images meeting requirements can be captured.

Figure 5:
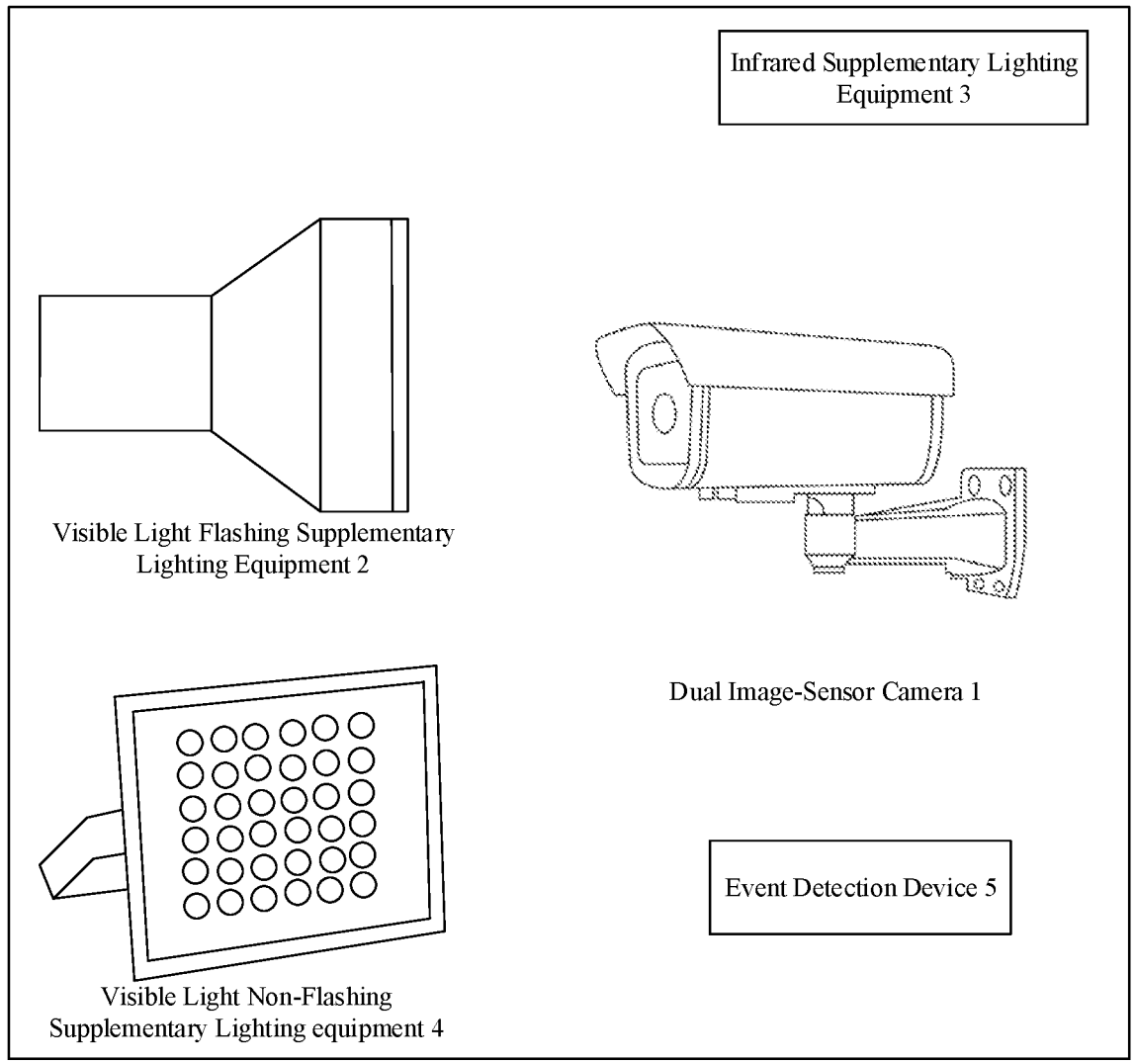
FIG. 5 is a schematic diagram of the image capturing system provided by another example of the present disclosure.

In an example, FIG. 5 is a schematic diagram of the image capturing system provided by an example of the present disclosure. Referring to FIG. 5, the system provided by this example further includes an event detection device 5 on the basis of the above example, where the event detection device 5 controls the camera 1 to switch between the first working mode and the second working mode according to the event detection result.

In an example, the event detection device 5 includes a time detection device or/and an ambient brightness detection device. The event detection device can be arranged separately or integrated in the camera 1. The time detection device may be a timer, clock circuit, or other equipment which can detect the current time. The ambient brightness detection device may be a light sensor or other equipment which can detect the brightness of the current ambient light. The arrangement of the event detecting device, and the implementation of the time detection device and the ambient brightness detection device are not limited in this disclosure. It should be noted that the specific implementation principle and implementation process of controlling the camera 1 to switch between the first working mode and the second working mode according to the event detection result can be referred to the description in the previous example, and will not be repeated here.

The system provided by this example can provide an event detection device which controls the camera to switch between the first working mode and the second working mode according to the event detection result. In this way, automatic control of the camera can be realized.

Further, according to the event detection result, the event detection device 5 also controls the visible light flashing supplementary lighting equipment 2 to be turned on in the first working mode and turned off in the second working mode; controls the infrared supplementary lighting equipment 3 to be turned off in the first working mode and turned on in the second working mode; and controls the visible light non-flashing supplementary lighting equipment 4 to be turned off in the first working mode, and be turned on in the second working mode.

For the specific control principle and control process, reference can be made to the description in the previous example, which will not be repeated here.

The system provided by this example automatically controls the visible light flashing supplementary lighting equipment, the infrared supplementary lighting equipment, and the visible light non-flashing supplementary lighting equipment through the event detection device, so that the visible light flashing supplementary lighting equipment, the infrared supplementary lighting equipment, and the visible light non-flashing supplementary lighting equipment work according to the current working mode of the camera.

A specific example is given below to illustrate in detail the image capturing system provided by the present disclosure.

Figure 6:
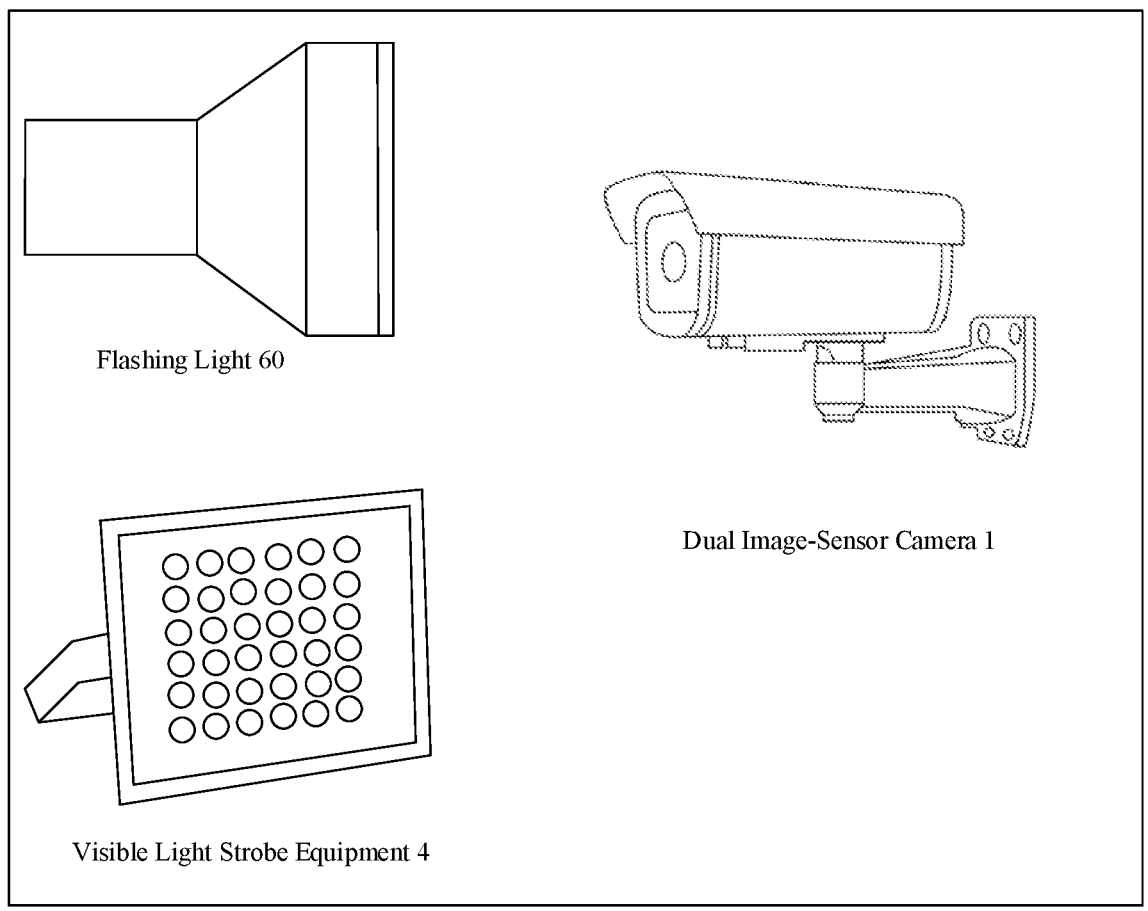
FIG. 6 is a schematic diagram of an image capturing system according to an example of the present disclosure.

FIG. 6 is a schematic diagram of an image capturing system according to an example of the present disclosure. Referring to FIG. 6, in the image capturing system provided by this example, the visible light flashing supplementary lighting equipment 2 and the infrared supplementary lighting equipment 3 are integrated in a flashing light 60, and the flashing light 60 performs visible light flashing supplementary lighting in the first working mode, and performs infrared flashing supplementary lighting in the second working mode. Further, in this example, the visible light non-flashing supplementary lighting equipment 4 is visible light strobe-strobe equipment. In addition, in the system provided in this example, the camera 1 is integrated with an event detection device.

Figure 7:
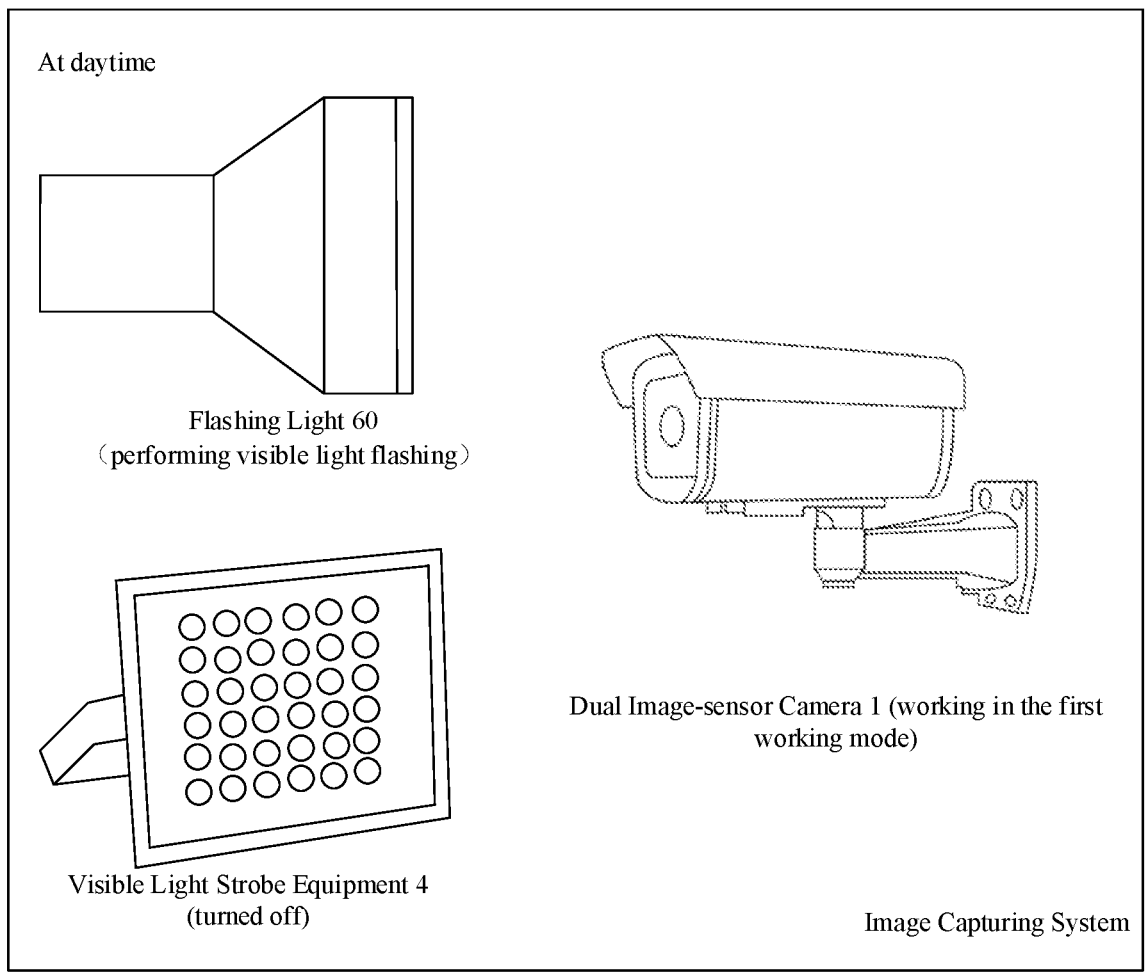
FIG. 7 is a schematic diagram illustrating the working mode in the daytime of the image capturing system shown in FIG. 6.
Figure 8:
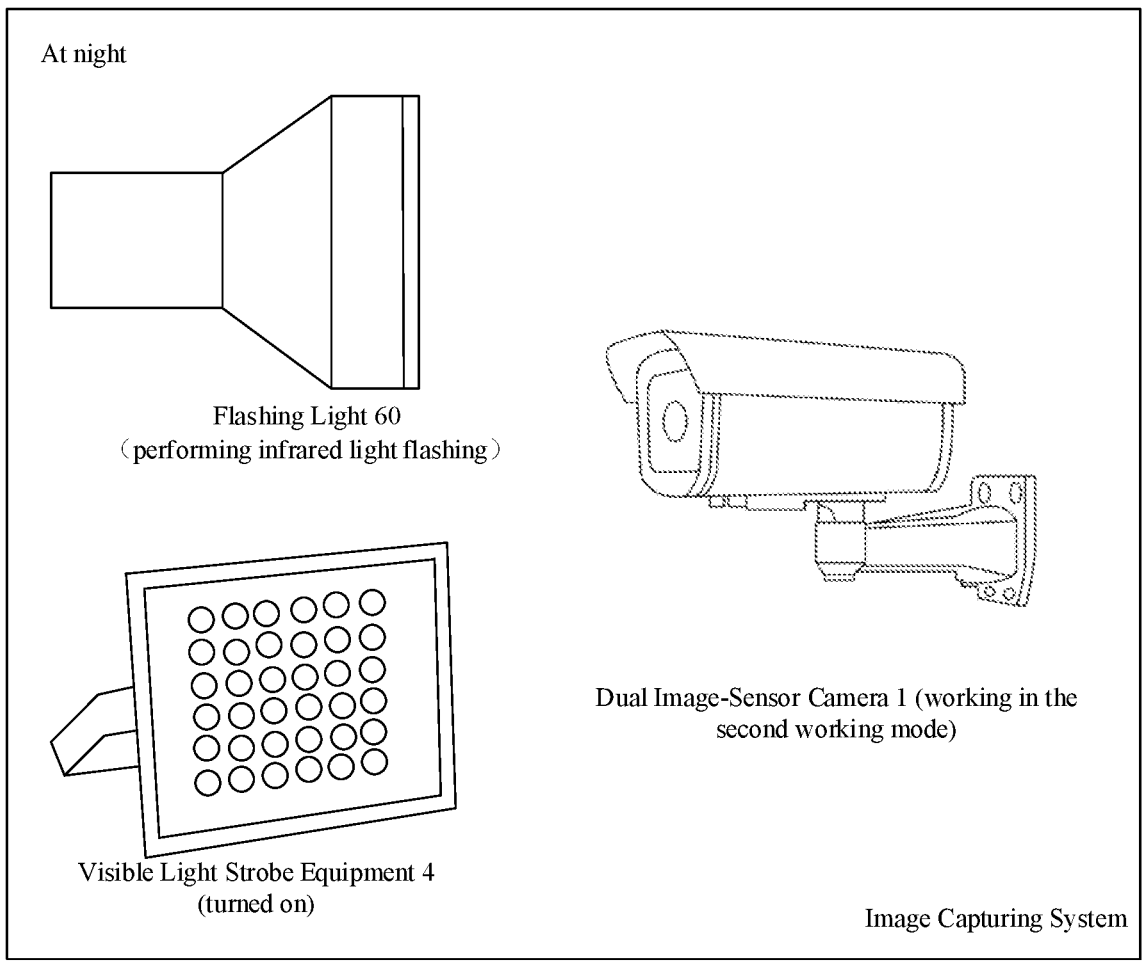
FIG. 8 is a schematic diagram illustrating the working mode at night of the image capturing system shown in FIG. 6.

FIG. 7 is a schematic diagram of the image capturing system shown in FIG. 6 operating in the daytime, and FIG. 8 is a schematic diagram of the image capturing system shown in FIG. 6 operating at night. Referring to both FIG. 7 and FIG. 8, in one example, when the camera detects that the ambient brightness is higher than or equal to the preset threshold (daytime), at this time, as shown in FIG. 7, the camera 1 controls the device to switch to the first working mode, and the flashing light 60 is controlled to switch to the visible light flashing mode, and the visible light strobestrobe equipment 4 is controlled to switch to the off state. At this time, the camera captures visible light images based on the visible light in the environment to obtain a video image. Further, when a capture signal is detected, the flashing light 60 is controlled to perform a flash, and a visible light image is captured based on the visible light emitted by the flashing light 60 to obtain a snapshot.

Further, when the camera detects that the ambient brightness has dropped below the preset threshold (at night), referring to FIG. 8, the camera 1 controls the device to switch to the second working mode, controls the flashing light 60 to switch to infrared light flashing mode, and controls the visible light strobestrobe equipment 4 to switch to the on state. At this time, the camera 1 captures visible light images and infrared images based on the visible light emitted by the visible light strobe equipment 4 and the infrared light in the environment, and then performs fusion processing on the visible light images and the infrared images to obtain a video image (the video image are color images). Further, when the capture signal is detected, the flashing light is controlled to flash, and the visible light strobe equipment is controlled to flash synchronously. At this time, infrared images and visible light images are captured based on the infrared light emitted by the flashing light and the visible light emitted by the visible light strobe equipment, and fusion processing is performed on the captured visible light images and infrared images to obtain snapshots (the snapshots are colored images).

In this example, an image capturing system that can be adapted to both day and night is provided, so as to avoid light pollution and that obtained images do not meet the requirements.

Further, the structure of the dual image-sensor camera 1 in the image capturing system provided in this example may be as shown in FIG. 1. Referring to FIG. 1, the dual image-sensor camera 1 further includes a lens, a light splitting module, and a polarization module. In the first working mode, the camera controls the light through the lens to be split and polarized before entering the first sensor.

In the second working mode, the camera controls the light through the lens to be split before entering the first image sensor and the second image sensor.

Specifically, still referring to FIG. 1, in the first working mode, the camera 1 controls the light through the lens to be split by the light splitting module, and controls the visible light obtained from the splitting to be polarized by the polarizer before entering the first image sensor, so as to control the first image sensor to capture visible light images. In the second working mode, the camera controls the light through the lens to be split by the light splitting module, and enables the visible light obtained from the splitting to enter the first image sensor, and the infrared light obtained from the splitting to enter the second image sensor, so as to control the first image sensor to capture visible light images and the second image sensor to capture infrared images.

Further, the camera further includes an image processing device, wherein:

the image processing device is configured to perform ISP processing and encoding processing on the visible light image in the first working mode; perform ISP processing and encoding processing on the fused image resulted from the fusion processing in the second working mode.

Specifically, referring to FIG. 1, in an example, the image processing device may be integrated in the chip 16, that is, the image processing device may be implemented by an image processing chip, which is not limited in this disclosure.

The above descriptions are only the preferred examples of the present disclosure, and are not intended to limit the present disclosure. Any modification, equivalent replacement, improvement, etc. made within the spirit and principle of the present disclosure shall be included within the protection scope of this disclosure.

The invention claimed is:

1. An image capturing method, comprising:
controlling a camera to switch between a first working mode and a second working mode according to an event detection result;
wherein in the first working mode,
receiving visible light flashing supplementary lighting, and
controlling a first image sensor to perform visible light image capturing, to obtain a visible light image in the first working mode;
in the second working mode,
receiving visible light non-flashing supplementary lighting and infrared supplementary lighting,
controlling the first image sensor to perform visible light image capturing, to obtain a visible light image in the second working mode,
controlling a second image sensor to perform infrared image capturing, to obtain an infrared image, and
performing fusion processing on the visible light image and the infrared image in the second working mode;
wherein the method further comprises:
performing light splitting processing on light received by the camera;
wherein in the first working mode, visible light obtained from the light splitting processing is subject to polarization processing and guided to the first image sensor;
in the second working mode, visible light obtained from the light splitting processing is guided to the first image sensor, and infrared light obtained from the light splitting processing is guided to the second image sensor.

2. The method of claim 1, wherein the event detection result comprises: a time point detection result or/and an ambient brightness detection result.

3. The method of claim 1, further comprising:
in the first working mode, performing image signal processing and encoding processing on the obtained visible light image;
in the second working mode, performing image signal processing and encoding processing on a fused image obtained from the fusion processing.

4. The method of claim 1, further comprising:
controlling, according to the event detection result, flashing equipment to perform visible light flashing in the first working mode, and to perform infrared light flashing in the second working mode.

5. The method of claim 1, further comprising:
controlling, according to the event detection result, visible light non-flashing equipment to be turned off in the first working mode and to be turned on in the second working mode.

6. The method of claim 1, wherein the infrared supplemental lighting comprises infrared flashing supplementary lighting or infrared constant supplementary lighting.

7. The method of claim 1, wherein the visible light non-flashing supplementary lighting comprises visible light strobe supplementary lighting or visible light constant supplementary lighting.

8. An image capturing system, comprising:
a camera configured to comprise a first image sensor and a second image sensor;
wherein in a first working mode, the camera is configured to
control the first image sensor to perform visible light image capturing, to obtain a visible light image in the first working mode,
in a second working mode, the camera is configured to
control the first image sensor to perform visible light image capturing, to obtain a visible light image in the second working mode,
control the second image sensor to perform infrared image capturing, to obtain an infrared image, and
perform fusion processing on the visible light image and the infrared image in the second working mode;
visible light flashing supplementary lighting equipment, wherein the visible light flashing supplementary lighting equipment is turned on in the first working mode, and turned off in the second working mode;
infrared supplementary lighting equipment, wherein the infrared supplementary lighting equipment is turned off in the first working mode, and turned on in the second working mode; and
visible light non-flashing supplementary lighting equipment, wherein the visible light non-flashing supplementary lighting equipment is turned off in the first working mode, and turned on in the second working mode;
wherein the camera further comprises:
a lens; and
a light splitting module disposed between the lens and the first image sensor and the second image sensor, and is configured to perform light splitting processing on light entering the lens;
wherein when the camera is in the second working mode, visible light output by the light splitting module is guided into the first image sensor, and infrared light output by the light splitting module is guided into the second image sensor.

9. The system of claim 8, further comprising:
an event detection device configured to control the camera to switch between the first working mode and the second working mode according to an event detection result thereof.

10. The system of claim 9, wherein the event detection device comprises a time detection device or/and an ambient brightness detection device;
the event detection device is configured to:
control the camera to switch from the second working mode to the first working mode in response to the time detection device detecting that current time is later than a first time point or/and in response to the ambient brightness detection device detecting that current ambient brightness is higher than or equal to a preset threshold; and
control the camera to switch from the first working mode to the second working mode in response to the time detection device detecting that the current time is later than a second time point or/and in response to the ambient brightness detection device detecting that the current ambient brightness is lower than the preset threshold.

11. The system of claim 8, wherein a polarization module is further provided between the light splitting module and the first image sensor,
wherein when the camera is in the first working mode, the visible light output by the light splitting module is subjected to polarization processing by the polarization module before being guided to the first image sensor.

12. The system of claim 8, wherein the camera further comprises an image processing device, wherein:
the image processing device is configured to perform image signal processing and encoding processing on the visible light image in the first working mode; perform image signal processing and encoding processing on a fused image resulted from the fusion processing in the second working mode.

13. The system of claim 8, wherein the visible light non-flashing supplementary lighting equipment comprises visible light strobe equipment or visible light constant equipment.

14. The system of claim 8, wherein the infrared supplementary lighting equipment comprises infrared flashing equipment or infrared constant equipment.

15. The system of claim 8, wherein the visible light flashing equipment and the infrared supplementary lighting equipment are integrated, so that visible light flashing supplementary lighting is performed in the first working mode, and infrared light flashing supplementary lighting is performed in the second working mode.

16. The system of claim 8, wherein the visible light flashing supplementary lighting equipment performs visible light flashing supplementary lighting in response to a capture signal received by the camera.

* * * * *